A. H. MORRILL.
CAR WHEEL.
No. 22,972. Patented Feb. 15, 1859.
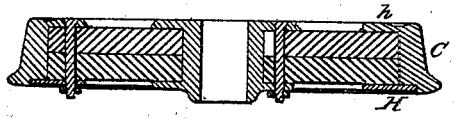
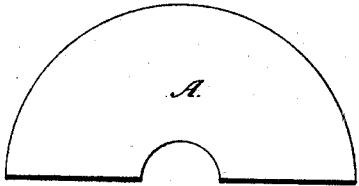
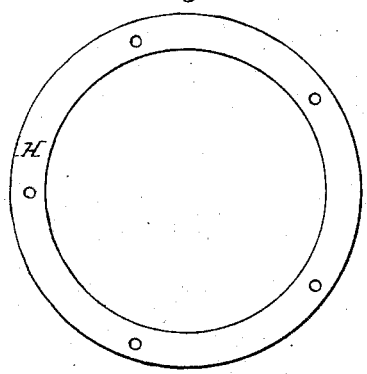
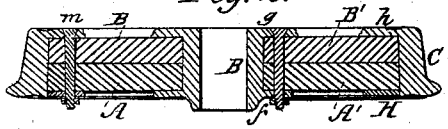
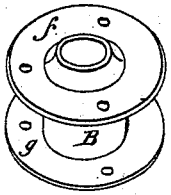
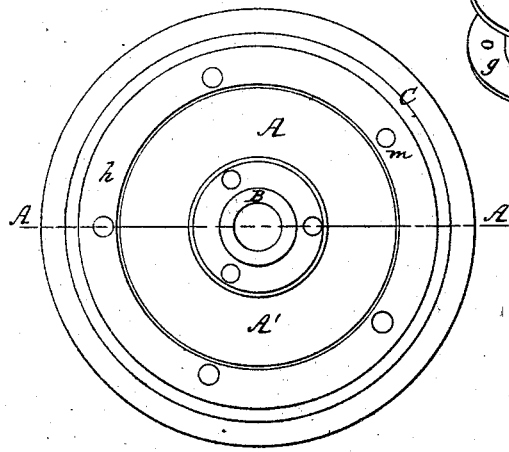
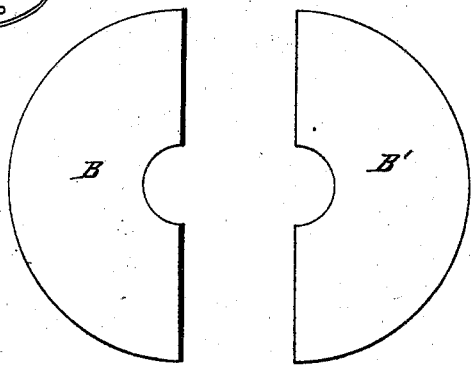

UNITED STATES PATENT OFFICE.

A. R. MORRILL, OF NORTHFIELD, VERMONT.

WHEEL FOR RAILROAD-CARRIAGES.

Specification of Letters Patent No. 22,972, dated February 15, 1859.

*To all whom it may concern:*

Be it known that I, A. R. MORRILL, of Northfield, in the county of Washington and State of Vermont, have invented a new and Improved Wheel for Railroad-Carriages, of which the following is a full, clear, and exact description, reference being had to the accompanying drawings, making part of this specification, in which—

Figure 1, is a side view of the wheel. Fig. 2 a section upon the line A, A, of Fig. 1. Fig. 3, a view of the hub detached, and Figs. 4, 5, 6, and 7, details to be referred to hereafter.

A railroad car wheel that shall be safe, light, economical and durable, and shall at the same time possess the requisite hardness of tread, has long been a desideratum. The chilled cast iron wheels most commonly in use, have the desired hardness of tread, but it is known that they are rendered unsafe and exceedingly liable to crack and fail in use by the very process which is depended upon to harden the tread. On this account wheels have been made in which blocks of wood were interposed between the hub, and a wrought iron tire. Manifestly some of the qualities of a good wheel were thus insured, to wit lightness and safety, the wheel was however too expensive for general introduction as much labor was required to fit the wooden blocks to receive the tire, while the wheel was not durable owing to the deficient hardness of the wrought iron tread.

My invention has for its object to produce a wheel that shall be of small original cost and easily replaced when worn out—not liable to break or crack even in the coldest weather and consequently safe—that shall possess the requisite hardness of tread to make it durable and that shall be light compared with other wheels of an equal strength. These ends I have attained in an imminent degree and in order that others skilled in the art may understand my invention I will proceed to describe the manner in which I have carried it out.

The hub, B, is cast with flanges $f$ and $g$, (Fig. 3,) and is secured to the axle in the manner ordinarily adapted for cast iron wheels. The rim C, is also cast and chilled, but being unconnected with either hub or spokes is not strained or weakened by the process. The body of the wheel between the hub and rim is formed of wood as follows. Semicircles A, A', B, B', are cut from plank of suitable hard wood, these semicircles are then adjusted to the hub, the four being so placed that the grain of the lower pair is at right angles to that of the upper pair. The disks or semicircles are then secured to the hub by bolts and nuts. The wheel is now turned down so that the periphery of the wood shall just fit within the rim, into which it is then forced, the wood resting upon the flange $h$, projecting in from the rim, a metallic ring H, (Fig. 6) is then placed upon the wood, and bolts $m$, are passed through the ring, the wood and the flange $h$, to hold the whole together.

In the wheel represented in Fig. 7, the ring H, is wider than in the one above described and projects a short distance over the rim, a recess being cut in the latter to accommodate it. With a wheel thus made, should the rim by any accident break, the wood will run upon the rail, and the ring will serve as a flange to keep the wheel from leaving the track. The wooden portion of the wheel is above described as consisting of two disks formed of semicircles, but under certain circumstances I propose forming the wheels of three or more disks, such change however will manifestly not alter the principle of my invention.

Among the advantages which this wheel possesses may be enumerated the following.

Firstly. It is cheaper even than the cast iron chilled wheel in most common use. The cost of the former averaging from $16 to 18, while my improved wheel can be constructed for about $15.

Secondly. The cost of renewal is much less than with the cast iron wheel the latter costing $7.70 to renew and the former $4.62.

Thirdly. Where the cast iron wheel is renewed the old wheel is drawn from the axle and the new one secured thereto and many accidents have arisen from the looseness occasioned by the frequent changes of the wheels.

In renewing my improved wheel the axle is not drawn from the hub, it being simply necessary to replace the rim and restore the bolts $m$.

Fourthly. A great advantage results from the diminished weight of the wheel, there being a saving of 100 lbs. per wheel or 800 lbs. per car, amounting in a train of 20 cars to 8 tons on 5 per cent. of the dead weight.

Fifthly. Increased elasticity in the wheel by which the rails are greatly saved in wear.

Sixthly. In case of accident the damage is much less from breakage of wheels than is the case with the ordinary cast iron wheel.

Seventhly. These wheels are far less noisy than the cast iron wheels.

Eighthly. The tire cast in the manner proposed is not subjected to strain in casting, and a safe and durable wheel may always be had.

I do not claim the interposition of wood between the hub and rim of railroad wheels, when the wood is arranged in tapering blocks the grain of which runs radially of the wheel, neither do I claim any wheel having a wrought iron rim or tire as such wheel would by no means attain the ends, which I have in view but—

What I claim as my invention and desire to secure by Letters Patent is a wheel for railroad purposes having a cast iron hub, and rim and a body of wood formed of double plates as described and secured to the hub and rim by bolts as set forth.

A. R. MORRILL.

Witnesses:
R. CAMP, Sr.,
ELIJAH SMITH.